US010645169B2

(12) United States Patent
Evans et al.

(10) Patent No.: US 10,645,169 B2
(45) Date of Patent: May 5, 2020

(54) MANAGING UNMANNED AERIAL VEHICLE FLIGHT DATA

(71) Applicant: Verizon Patent and Licensing Inc., Basking Ridge, NJ (US)

(72) Inventors: Jonathan Evans, Portland, OR (US); Eric T. Ringer, Portland, OR (US); Warren Westrup, Irving, TX (US); Derek Wade Ohlarik, Flemington, NJ (US); Joe Cozzarelli, Whippany, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 128 days.

(21) Appl. No.: 15/818,454

(22) Filed: Nov. 20, 2017

(65) Prior Publication Data

US 2019/0158597 A1  May 23, 2019

(51) Int. Cl.
*H04L 29/08* (2006.01)
*B64C 39/02* (2006.01)
*G05D 1/00* (2006.01)
*G08G 5/00* (2006.01)

(52) U.S. Cl.
CPC ............ *H04L 67/12* (2013.01); *B64C 39/024* (2013.01); *G05D 1/0011* (2013.01); *G08G 5/0013* (2013.01); *G08G 5/0017* (2013.01); *G08G 5/0026* (2013.01); *G08G 5/0043* (2013.01); *G08G 5/0069* (2013.01); *G08G 5/0082* (2013.01); *B64C 2201/122* (2013.01)

(58) Field of Classification Search
CPC . H04L 67/12; B64C 39/024; B64C 2201/122; G05D 1/0011; G08G 5/0017; G08G 5/0013; G08G 5/0026; G08G 5/0043; G08G 5/0069; G08G 5/0082
See application file for complete search history.

(56) References Cited

U.S. PATENT DOCUMENTS

| | | | |
|---|---|---|---|
| 9,274,521 B1 * | 3/2016 | Stefani | G08G 5/0026 |
| 10,073,449 B1 * | 9/2018 | Sait | H04L 67/12 |
| 2010/0066604 A1 * | 3/2010 | Limbaugh | G08G 5/0013 342/357.31 |
| 2014/0018976 A1 * | 1/2014 | Goossen | G06F 17/00 701/2 |
| 2016/0101855 A1 * | 4/2016 | Stefani | G08G 5/0008 701/2 |
| 2016/0275801 A1 * | 9/2016 | Kopardekar | G08G 5/0043 |
| 2017/0069214 A1 * | 3/2017 | Dupray | G08G 5/0021 |
| 2017/0358224 A1 * | 12/2017 | Priest | G08G 5/0026 |
| 2018/0004201 A1 * | 1/2018 | Zach | G05D 1/0022 |
| 2018/0350245 A1 * | 12/2018 | Priest | G08G 5/0039 |
| 2018/0375568 A1 * | 12/2018 | De Rosa | H04B 7/18506 |
| 2019/0088145 A1 * | 3/2019 | Chambers | G08G 5/045 |
| 2019/0259287 A1 * | 8/2019 | Mustafic | G08G 5/0034 |

* cited by examiner

*Primary Examiner* — Courtney D Heinle

(57) ABSTRACT

A device can be configured to receive flight data associated with an unmanned aerial vehicle (UAV), at least some of the flight data being received from the UAV; store the flight data; receive, from a requesting device, a flight data request, the flight data request including information identifying the UAV or a flight of the UAV; determine response data based on the flight data request and based on an entity associated with the requesting device, the response data including a subset of the flight data, which is available to be accessed by the entity; and perform an action associated with the response data.

20 Claims, 6 Drawing Sheets

MANAGING UNMANNED AERIAL VEHICLE FLIGHT DATA

BACKGROUND

Unmanned aerial vehicles (UAVs) are often operated in a variety of areas, by a variety of users, and for a variety of purposes. UAV flight data (e.g., data that specifies flight information for a UAV flight) might or might not be available for a given UAV flight. The availability of flight data might depend on the manner in which flight data is collected and stored, if flight data is collected at all.

DETAILED DESCRIPTION OF PREFERRED EMBODIMENTS

Figure 1A:
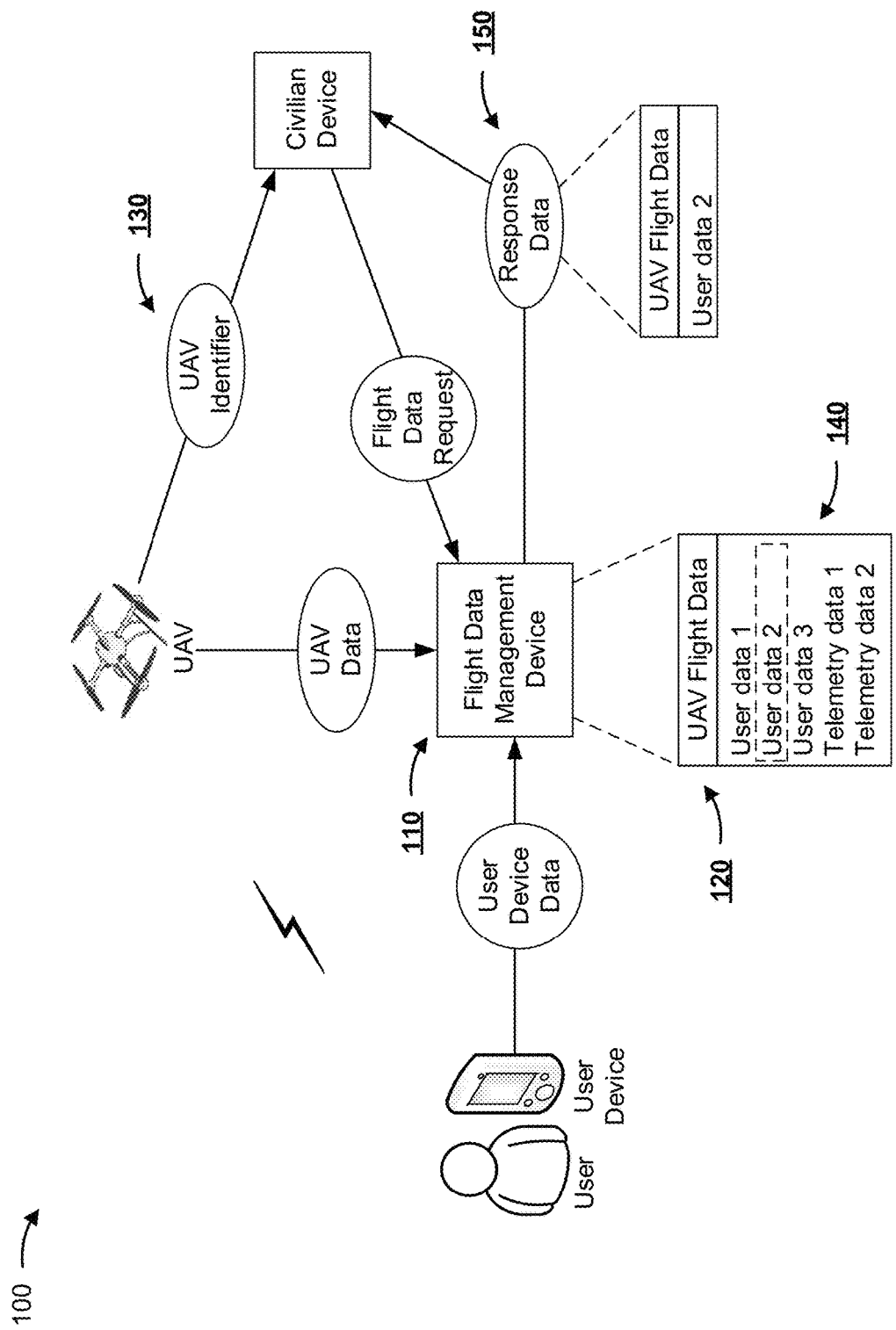
FIGS. 1A and 1B are diagrams of an overview of an example implementation described herein.

The following detailed description of example implementations refers to the accompanying drawings. The same reference numbers in different drawings can identify the same or similar elements.

Unmanned Aerial Vehicle (UAV) flight data can encompass a significant amount of data related to a given UAV and/or UAV flight, including data related to a pilot of the UAV, data related to the environment in which the UAV is to be flown, was flown, or is flying, and data related to the UAV itself. The actual flight data available for a UAV flight can vary (e.g., depending on where and how flight data is collected and how access to flight data is given). For example, during flight, a UAV can periodically provide a user device with telemetry data that can include a variety of information from sensors or other components of the UAV. However, the frequency and amount of telemetry data provided by the UAV can be limited by the sensors of the UAV, an ability of the UAV to provide telemetry data, and/or the technology used to transmit telemetry data. In addition, flight data (whether provided by a UAV or from another source), might not be stored, might only be partially stored, and/or might be inaccessible to entities who would benefit from access to the flight data, such as a UAV crash investigator or law enforcement personnel. In some situations, access to flight data might not be properly controlled, and too much flight data might be accessible to those individuals who should not have access to certain portions of flight data.

Some implementations, described herein, provide a flight data management device to facilitate the collection of, transmission of, storage of, and/or access to flight data. For example, the flight data management device can obtain, for a particular UAV or UAV flight, flight data that includes user device data from a user device in communication with a UAV; UAV data, including telemetry data, from the UAV; and/or flight data from one or more other flight data providers, such as another aircraft sharing nearby airspace and/or one or more server devices. User device data can include data provided by a user device in communication with a UAV, such as a user identifier, user device identifier, UAV pilot identifier, and/or user device location data; UAV data can include data related to a UAV, such as UAV battery data, UAV flight speed data, UAV altitude data, wind speed data, humidity data, UAV location data, UAV identifier, data identifying UAV software, and/or data specifying UAV maintenance records.

Flight data can be provided to the flight data management device in a variety of ways. In some implementations, UAV data can be provided from a UAV using a Long-Term Evolution (LTE) Category M1 (LTE Cat M1) device included in the UAV. The flight data management device can, in some implementations, obtain flight data for many UAVs from many user devices, UAVs, and/or flight data providers. For example, the flight data management device can receive millions, billions, trillions, etc. of pieces of flight data from hundreds, thousands, millions, etc. of sources regarding hundreds, thousands, millions, etc. of UAVs and UAV flights. Thus, the flight data management device can operate upon big data using big data techniques that cannot be processed by human operators.

UAV flight data can be stored by the flight data management device in a manner designed to control access to the flight data by different entities. For example, a UAV user, or UAV pilot, might have access to all of the flight data, a law enforcement officer might have access to a first subset of the flight data, and a civilian might have access to a second subset of the flight data. During operation, the flight data management device can receive a request for flight data associated with a particular UAV. Based on the requestor, the flight data management device can determine a subset of the flight data available to the requestor and then perform an action, such as providing the requestor with response data that includes the determined subset of the flight data.

Some implementations described herein can enable extensive collection of, transmission of, and/or storage of flight data, which can increase the volume and accuracy of flight data stored for UAV flights. This can allow detailed analysis to be performed for a UAV flight, such as UAV flight diagnostics, troubleshooting, crash recovery, investigation, or the like. In addition, selectively controlling access to flight data can facilitate relatively fast and secure flight data access (e.g., in a manner designed to ensure that different entities, such as UAV pilots, law enforcement officers, government regulators, and general members of the public, have access to UAV data in an intended manner, such as the manner as intended by an administrator of the flight data management device).

Some implementations described herein can use LTE Cat M1 or similar technology to communicate flight data for a UAV flight, which can improve flight data collection in a variety of ways. For example, LTE Cat M1 does not require visual line of sight between transmitter and receiver like required by other communication technologies, LTE Cat M1 might have a greater transmission range than some transmission technologies, such as Wi-Fi or Bluetooth technology, and LTE Cat M1 might conserve UAV battery consumption over other communication technologies, such as LTE Cat 1, LTE Cat 5, or Wi-Fi. Accordingly, using LTE Cat M1 technology, or similar technology, can enable a UAV to provide telemetry data to the flight data management device or another device more frequently, at relatively long range, and without a substantial negative affect on UAV battery consumption. In some implementations, the similar technology might include 3.5 GHz Citizens Broadband Radio Service (CBRS) spectrum communications technology and/ or technology associated with a different radio access technology than LTE, such as 5G, New radio (NR), or the like. For example, the similar technology might include a battery-efficient or air-interface-efficient user equipment (UE) and/or a UE using a battery-efficient or air-interface efficient communication technique (e.g., narrowband Internet of Things (NB-IoT), enhanced machine type communications (eMTC), or the like). However, implementations described herein are not limited to LTE Cat M1 and/or similar technology.

Figure 1B:
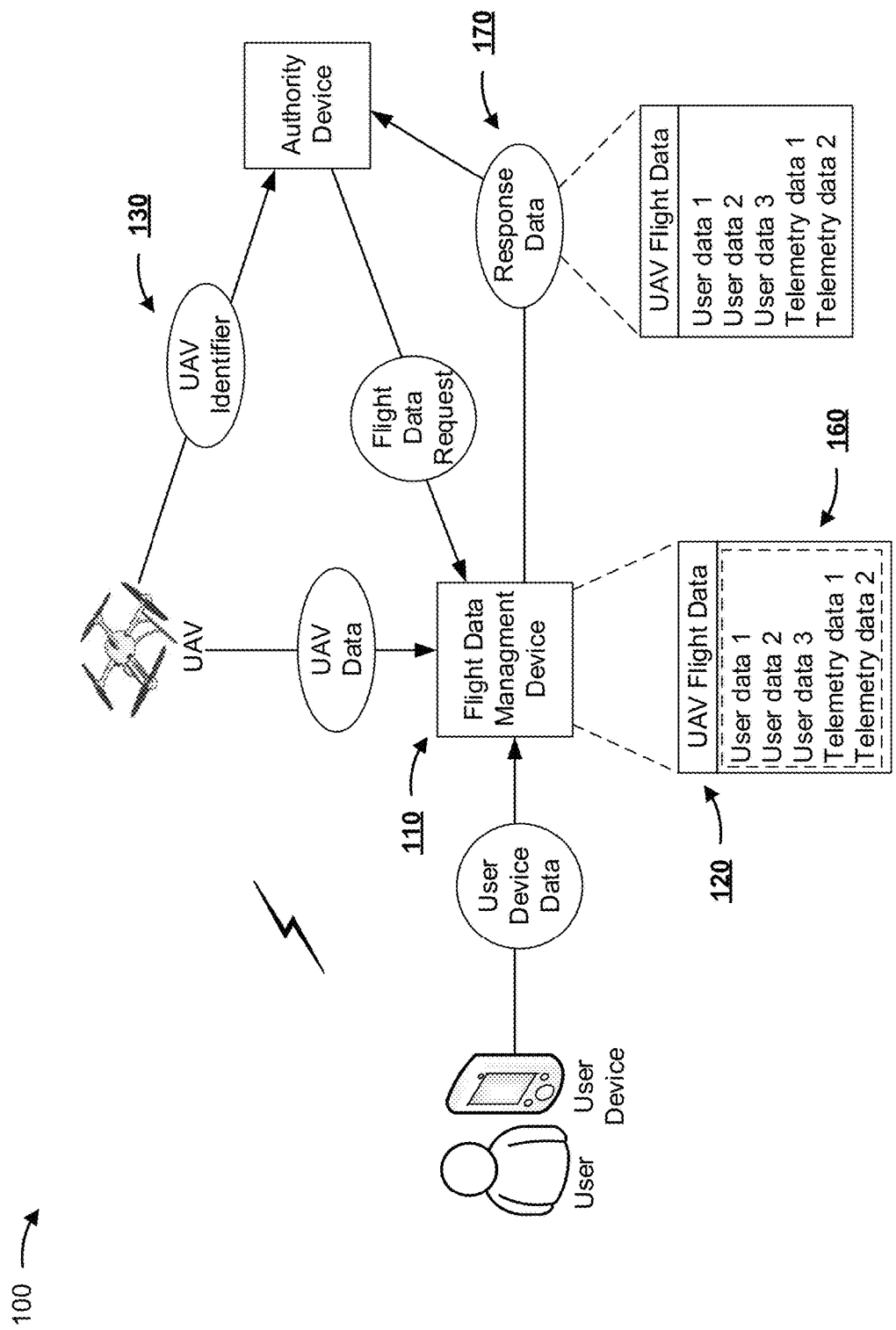

FIGS. 1A and 1B are diagrams of an overview of an example implementation 100 described herein. As shown in FIGS. 1A and 1B, example implementation 100 can include a user device, a flight data management device, a UAV, and a requesting device (e.g., depicted in FIG. 1A as a civilian device and in FIG. 1B as an authority device).

As shown in FIGS. 1A and 1B, and by reference number 110, the flight data management device obtains user device data and UAV data. For example, a UAV can periodically provide telemetry data (e.g., geographic coordinates, UAV speed, UAV altitude, wind speed, or the like) to the flight data management device using an LTE Cat M1 device included in the UAV, and the user device (e.g., a device used to operate the UAV) can provide user device data (e.g., user identifier, user device location, or the like) to the flight data management device.

As further shown in FIGS. 1A and 1B, and by reference number 120, the flight data management device stores flight data for the UAV (e.g., as UAV flight data). The example flight data includes three types of user data and two types of telemetry data, though multiple measurements can be included in the flight data for each type of data (e.g., multiple UAV altitude measurements can be recorded in UAV flight data, each stored with a timestamp corresponding to when the measurement was taken by the UAV and/or received by the flight data management device).

As further shown in FIGS. 1A and 1B, and by reference number 130, a requesting device obtains an identifier for UAV. For example, an individual might see a UAV flying nearby (e.g., over the individual's property) and, using an application and/or sensors of the requesting device, can obtain an identifier for the UAV. In FIG. 1A, the requesting device is a civilian device (e.g., a device not associated with any elevated access to flight data). In FIG. 1B, the requesting device is an authority device (e.g., a device associated with some elevated level of access to flight data). As also shown by reference number 130, the requesting device sends a flight data request to the flight data management device. In some implementations, the flight data request can include data identifying the UAV for which flight data is requested and/or a requestor identifier identifying the entity making the request.

As further shown in FIG. 1A, and by reference number 140, the flight data management device identifies a subset of the flight data based on the requesting device. For example, using a requestor identifier that identifies the requesting entity, the flight data management device can determine which pieces of the flight data are accessible to the requesting device. After determining which piece or pieces of flight data are accessible, the flight data management device can identify flight data to provide to the requesting device. As shown by reference number 140, the flight data management device identifies one portion of flight data, e.g., "User data 2," as the flight data accessible to the civilian device.

As further shown in FIG. 1A, and by reference number 150, the flight data management device provides the civilian device with response data that includes one piece of user data, e.g., "User data 2." For example, a civilian requestor with no elevated access to flight data can still have access to some flight data, such as the name and/or contact information of the UAV pilot and/or organization responsible for the UAV.

As further shown in FIG. 1B, and by reference number 160, the flight data management device identifies all of the flight data as accessible to the authority device. As further shown by reference number 170, the flight data management device provides the authority device with response data that includes all of the example flight data. For example, a law enforcement officer can have elevated access to flight data and be provided with more flight data than the civilian requestor, e.g., flight data such as a flight origin location, flight destination location, UAV pilot location, UAV payload, or the like.

Accordingly, the example implementation 100 depicts a flight data management device that enables extensive flight data collection, from potentially many sources and for many flights, and selectively providing access to collected flight data. Having more flight data available, and having flight data collected from many UAVs and other sources, can improve UAV flight analysis (e.g., before, during, or after a flight, and for improvement or troubleshooting purposes) and improved UAV flight analysis can lead to improved UAV flight safety and efficiency (e.g., by identifying patterns in flight data that might be indicative of a problem with a UAV flight). In addition, selective access to flight data can improve the control that an entity has over flight data for which the entity is responsible, which can improve privacy and user experience. Selective access to flight data can also improve public safety by providing authorized entities elevated access to flight data that can be used to prevent potential problems caused by a UAV in flight.

As indicated above, FIGS. 1A and 1B are provided merely as an example. Other examples are possible and can differ from what was described with regard to FIGS. 1A and 1B.

Figure 2:
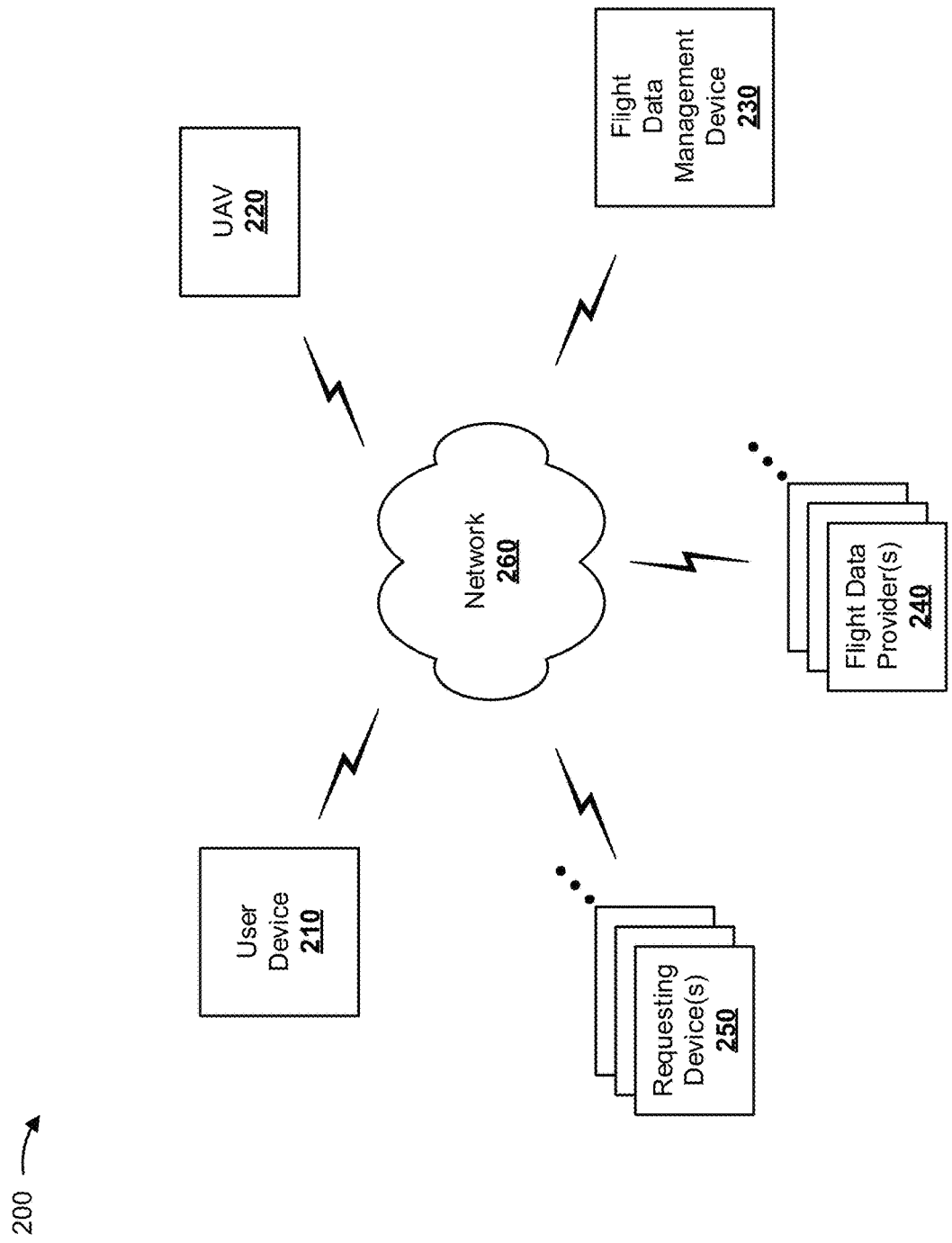
FIG. 2 is a diagram of an example environment in which systems and/or methods, described herein, can be implemented.

FIG. 2 is a diagram of a network environment 200 in which systems and/or methods, described herein, can be implemented. As shown in FIG. 2, environment 200 can include a user device 210, a UAV 220, a flight data management device 230, flight data provider(s) 240, requesting device(s) 250, and a network 260. Devices of environment 200 can interconnect via wired connections, wireless connections, or a combination of wired and wireless connections.

User device 210 includes one or more devices capable of receiving, generating, storing, processing, and/or providing information associated with UAV flight data. For example, user device 210 can include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, user device 210 can include an input device or peripheral for providing input, such as a touch screen display, keyboard, or microphone (e.g., for inputting flight data). Additionally, or alternatively, user device 210 can include a UAV remote control device or other UAV equipment in communication with a UAV. User device 210 can, in some implementations, include a communications interface that allows the user device 210 to receive information from and/or transmit information to other devices, such as flight data management device 230 and/or flight data provider(s) 240. For example, user device 210 can transmit flight data to flight data management device 230 and/or receive flight data from flight data provider(s) 240.

UAV 220 includes aircraft without a human pilot aboard, and can also be referred to as an unmanned aircraft (UA), drone, remotely piloted vehicle (RPV), remotely piloted aircraft (RPA), or remotely operated aircraft (ROA). UAV 220 can have a variety of shapes, sizes, configurations, characteristics, etc. for a variety of purposes and applications. In some implementations, UAV 220 can include one or more sensors, such as an electromagnetic spectrum sensor (e.g., visual spectrum, infrared, or near infrared cameras, radar systems, etc.), a biological sensor, a temperature sensor, a chemical sensor, a humidity sensor, or the like. In some implementations, UAV 220 can include one or more components for communicating with user device 210, flight data management device 230, and/or flight data provider(s) 240 (e.g., a component for communicating via network 260, such as an LTE communications component). For example, UAV 220 can transmit information to and/or can receive information from user device 210, flight data management device 230, and/or flight data provider(s) 240, such as sensor data, flight plan information, or the like. Such information can be communicated via network 260 (e.g., using LTE Cat M1 or similar communications technology).

Flight data management device 230 includes one or more devices capable of receiving, generating, storing, processing, and/or providing information associated with UAV flight data. For example, flight data management device 230 can include a communication and/or computing device, such as a server device or a group of server devices. In some implementations, flight data management device 230 can be implemented by one or more computing devices of a cloud computing environment or a data center. In some implementations, flight data management device 230 can correspond to user device 210. In other words, flight data management device 230 and user device 210 can be implemented within the same device or group of devices. In some implementations, flight data management device 230 can include a communications interface that allows the flight data management device 230 to receive information from and/or transmit information to user device 210, UAV(s) 220, flight data provider(s) 240, and/or requesting device(s) 250. For example, flight data management device 230 can receive flight data requests from requesting device(s) 250, receive flight data from user device 210, UAV(s) 220, and/or flight data provider(s) 240, and/or transmit flight data to requesting device(s) 250.

Flight data provider 240 includes one or more devices capable of receiving, generating, storing, processing, and/or providing information associated with flight data. For example, flight data provider 240 can include a communication and/or computing device, such as a server device or a group of server devices. Other examples of flight data provider 240 can include a UAV, a UAV sensor, or another UAV component. Flight data provider 240 can, in some implementations, include a communications interface that allows the flight data provider 240 to receive information from and/or transmit information to user device 210, UAV 220, and/or flight data management device 230. For example, flight data provider 240 can transmit weather and air traffic related flight data to user device 210, UAV 220, and/or flight data management device 230.

Requesting device 250 includes one or more devices capable of receiving and/or requesting information associated with UAV flight data. For example, requesting device 250 can include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, requesting device 250 can include an input device or peripheral for providing input, such as a touch screen display, keyboard, or microphone (e.g., for inputting flight data). Requesting device 250 can, in some implementations, include a communications interface that allows the requesting device 250 to receive information from and/or transmit information to other devices, such as flight data management device 230. For example, requesting device 250 can transmit a request for flight data to flight data management device 230 and/or receive flight data from flight data management device 230.

Network 260 includes one or more wired and/or wireless networks. For example, network 260 can include a cellular network (e.g., a long-term evolution (LTE) network (e.g., which can include Cat-M1 communications, 3.5 GHz CBRS spectrum communications, and/or the like), a code division multiple access (CDMA) network, a 3G network, a 4G network, a 5G network, or another type of cellular network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
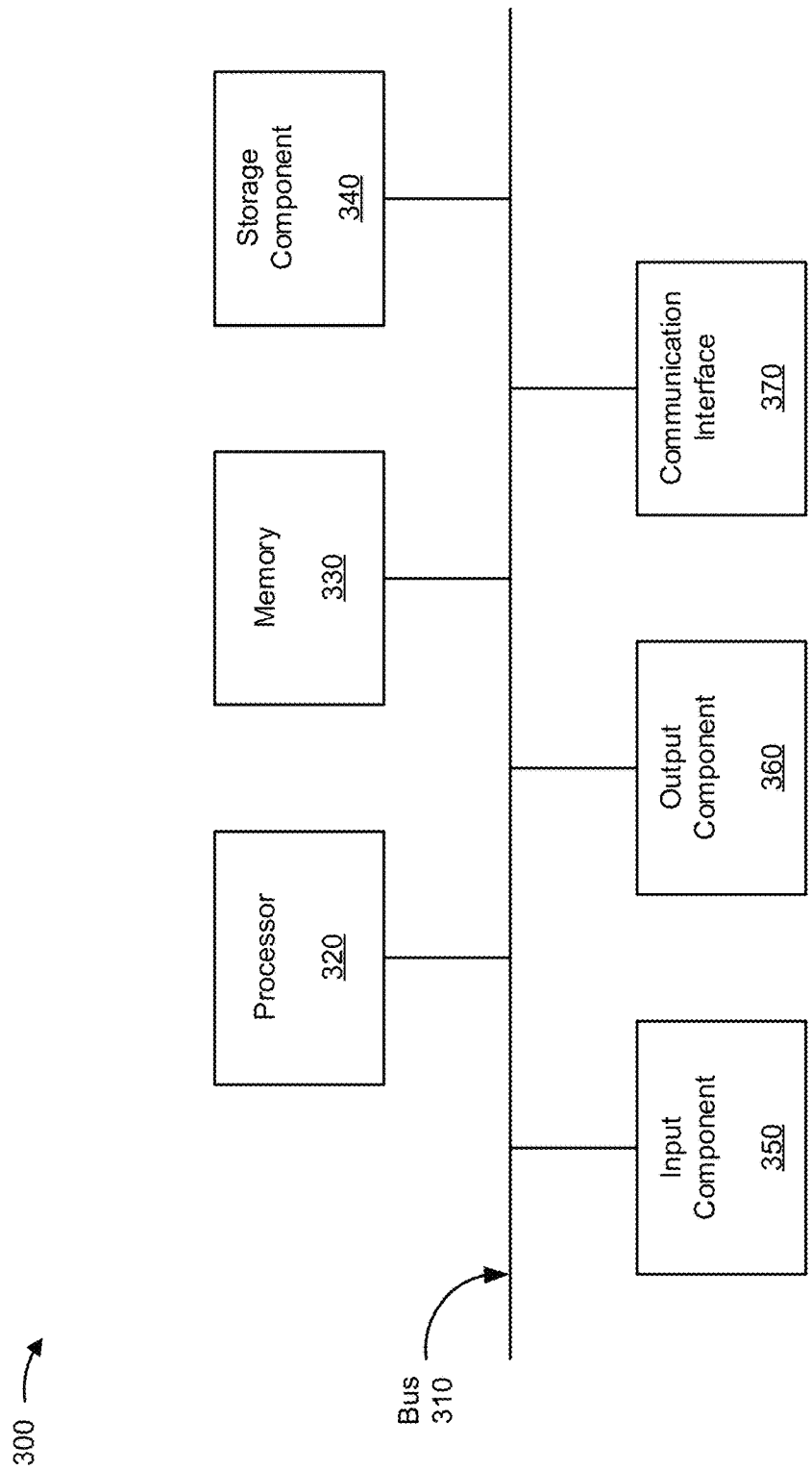
FIG. 3 is a diagram of example components of one or more devices of FIG. 2.

FIG. 3 is a diagram of example components of a device 300. Device 300 can correspond to user device 210, UAV 220, flight data management device 230, flight data provider 240, and/or requesting device 250. In some implementations, user device 210, UAV 220, flight data management device 230, flight data provider 240, and/or requesting device 250 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
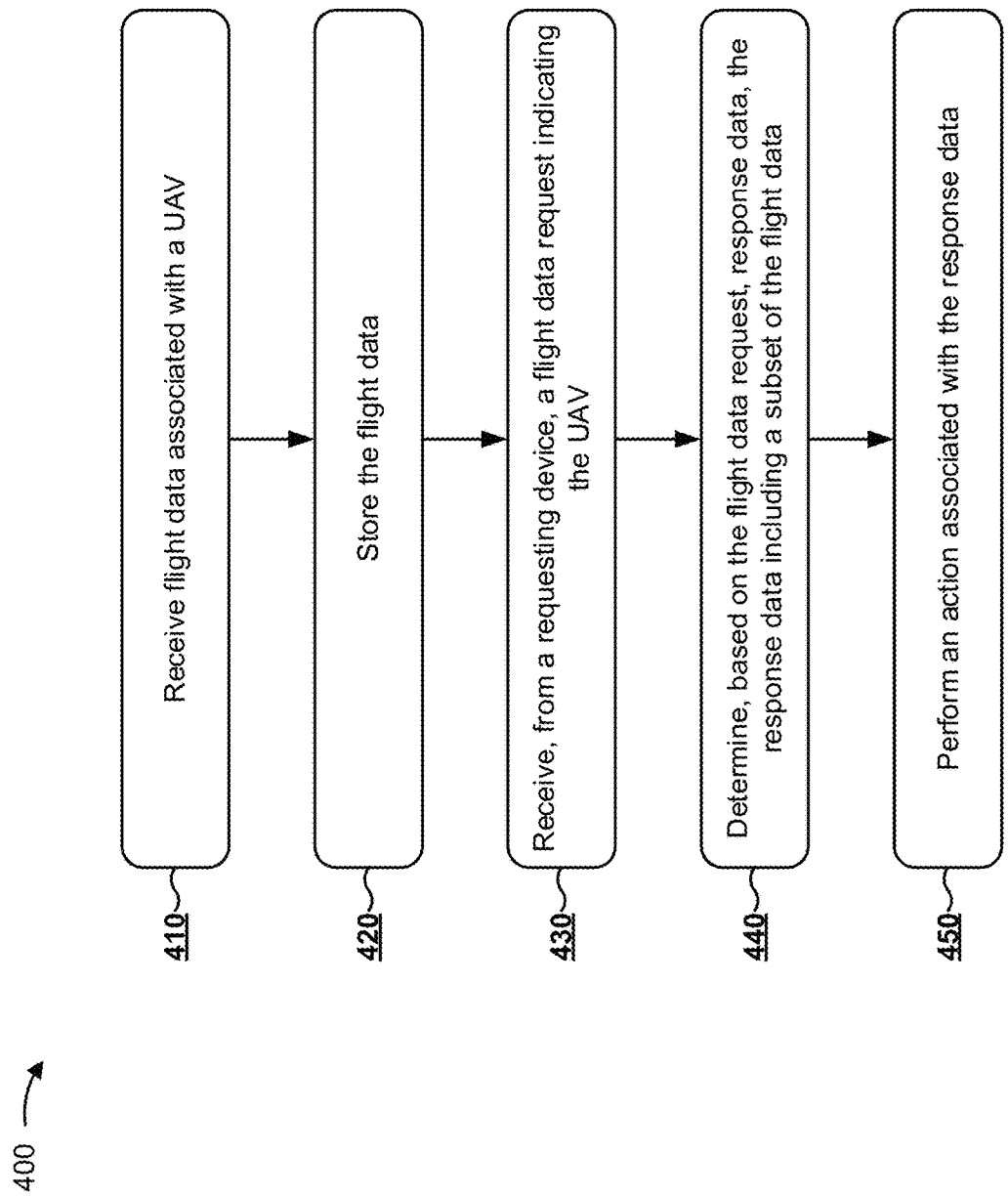
FIG. 4 is a flow chart of an example process for managing UAV flight data.

FIG. 4 is a flow chart of an example process 400 for managing UAV flight data. In some implementations, one or more process blocks of FIG. 4 can be performed by a flight data management device 230. In some implementations, one or more process blocks of FIG. 4 can be performed by another device or a group of devices separate from or including flight data management device 230, such as a user device 210, UAV 220, flight data provider 240, and/or requesting device 250.

As shown in FIG. 4, process 400 can include receiving flight data associated with a UAV (block 410). For example, flight data management device 230 can receive, from user device 210, UAV 220, and/or flight data provider(s) 240, flight data that includes, indicates, or specifies information regarding a UAV flight and/or a corresponding UAV 220. In some implementations, flight data can be received by flight data management device 230 before, during, and/or after a UAV flight. Examples of flight data can include information regarding: flight date, flight time, flight duration, flight altitude, flight origin location, flight destination location, flight path, wind speed, humidity, temperature, precipitation, visibility, sunset time, UAV model number, UAV owner/operator, UAV pilot, UAV flight ceiling, UAV weight, UAV maximum payload, UAV maximum wind speed, UAV maximum operating temperature, UAV minimum operating temperature, UAV maximum communication range, UAV maximum flight duration, UAV maximum speed, UAV maintenance data (e.g., an occurrence and/or log of maintenance performed on a UAV), UAV noise level (e.g., in terms of noise generated by a UAV), pilot location, pilot certifications, pilot maximum operating wind speed (e.g., a maximum wind speed in which a pilot is licensed to fly), pilot maximum flight operating duration (e.g., a time limit in minutes, hours, etc. for a pilot to control a UAV in the air), pilot minimum operating visibility (e.g., a minimum visibility in which a pilot is licensed to fly), pilot maximum operating range (e.g., in terms of a maximum measure of distance between pilot and UAV at which a pilot is licensed to fly and/or whether a pilot is licensed to operate a UAV outside of line of sight), most recent pilot flight (e.g., hours, days, etc. since last UAV flight piloted), career pilot hours (e.g., total hours flown by a pilot in a particular UAV and/or all UAVs), pilot contact information, and/or pilot employer contact information. While examples of flight data are provided above, in practice, flight data might include other types of data associated with a UAV flight and/or corresponding UAV 220.

In some implementations, flight data associated with a UAV flight and corresponding UAV 220 can be provided by user device 210. For example, before, during, and/or after the UAV flight, user device 210 can provide a UAV pilot identifier, UAV identifier, pilot location, UAV location, and/or other flight data to flight data management device 230. User device 210 can, in some implementations, obtain the flight data from user input and/or communications with UAV 220 and/or flight data provider(s) 240. For example, a user can provide a user identifier as user input to user device 210, global positioning satellite (GPS) equipment on user device 210 can be used to periodically obtain pilot location data, and the user identifier and pilot location data can be provided to flight data management device 230 as flight data for the UAV flight.

In some implementations, flight data associated with a UAV flight and corresponding UAV 220 can be provided by the UAV 220. For example, before, during, and/or after the UAV flight, UAV 220 can provide a UAV identifier, UAV location data, wind speed data, humidity data, UAV payload data, and/or other flight data to flight data management device 230. UAV 220 can, in some implementations, obtain the flight data from sensors or other equipment included in the UAV 220 and/or from communications with user device 210 and/or flight data provider(s) 240. For example, UAV 220 can use an anemometer to periodically obtain wind speed measurements, and the wind speed measurements can be provided to flight data management device 230 as flight data for the UAV flight.

In some implementations, a UAV can stream flight data and/or periodically provide flight data to user device 210, flight data management device 230, and/or flight data provider(s) 240. For example, a UAV 220 equipped with an LTE Cat M1 transmitter can provide telemetry data to user device 210 controlling the UAV 220, nearby UAVs equipped with LTE Cat M1 receivers, and/or flight data management device 230. In some implementations, a UAV 220 can provide flight data in bulk transfers, or block transfers. For example, a UAV 220 can be equipped with local storage that stores flight data to be transmitted at a later time (e.g., local storage can include a flight data cache that enables flight data to be transmitted when within range to transmit and/or a black box flight recorder type of data storage device that stores flight data until overwritten or removed).

In some implementations, flight data associated with a UAV flight and corresponding UAV 220 can be provided by flight data provider(s) 240. For example, before, during, and/or after the UAV flight, flight data provider(s) 240 can provide wind speed data, humidity data, visibility data, UAV maintenance data, and/or other flight data to flight data management device 230. By way of example, flight data provider(s) 240 can include a device for storing UAV maintenance logs, which can be requested by and/or provided to flight data management device 230 as flight data. As another example, flight data provider(s) 240 can include an aircraft, such as an airplane or another UAV (e.g., separate from but nearby the UAV 220 that corresponds to the UAV flight), that provides a wind speed measurement to flight data management device 230 as flight data for the UAV flight.

Additionally, or alternatively, flight data provider(s) 240 can provide, to flight data management device 230, flight data received from another UAV. For example, a UAV for which flight data management device 230 is recording flight data might be unable to communicate with flight data management device 230 (e.g., out of range or communications blocked by the weather or terrain). In this situation, flight data being broadcast by the UAV can be forwarded to flight data management device 230 by flight data provider(s) 240, such as another UAV flying close enough to the UAV to receive flight data broadcast by the UAV.

The manner in which flight data management device 230 receives flight data can vary. For example, some pieces of flight data can be provided to flight data management device 230 once per UAV flight (e.g., user identifier and UAV identifier can be provided by user device 210 prior to the UAV flight), some pieces of flight data can be provided periodically (e.g., telemetry data can be periodically provided by a UAV 220 during the UAV flight), and/or some pieces of flight data can be provided based on a request sent by flight data management device 230 (e.g., flight data management device 230 can request weather-related flight data from a weather data provider).

In some implementations, flight data can be provided to flight data management device 230 based on an occurrence of an event (e.g., based on a UAV 220 malfunctioning during the UAV flight, flight data management device 230 can request and receive UAV maintenance records for the UAV 220 from flight data provider(s) 240). Additionally, or alternatively, flight data can be provided to flight data management device 230 by a user of flight data management device 230. The capability to receive flight data from a variety of sources and in a variety of ways can facilitate the collection of extensive and accurate flight data by flight data management device 230.

In this way, flight data management device 230 can receive flight data to enable flight data management device 230 to store UAV flight data that can be used to provide extensive and accurate flight data in response to flight data requests.

As further shown in FIG. 4, process 400 can include storing the flight data (block 420). For example, flight data management device 230 can store flight data in local and/or remote storage. In some implementations, flight data can be stored in a distributed manner (e.g., across multiple storage devices, both local and remote). Additionally, or alternatively, flight data can be stored using blockchain technology, allowing user device 210, UAV 220, flight data management device 230, and/or flight data provider(s) 240 to function as nodes in a blockchain storage network. For example, for a particular UAV or UAV flight, some or all of the corresponding flight data can be stored in a blockchain using user device 210, UAV 220, flight data management device 230, and/or flight data provider(s) 240 to store the flight data in a secure and distributed manner. Other methods of storing data can be used by flight data management device 230 in some implementations.

In some implementations, flight data management device 230 can store data for controlling access to flight data. For example, flight data management device 230 can associate portions of flight data with one or more roles and/or entities, permitting access to those portions of flight data based on requests associated with those roles and/or entities. By way of example, flight data management device 230 can associate all flight data with a UAV pilot role (e.g., in a manner designed to allow a UAV pilot to access all of the flight data for a UAV or UAV flight). As another example, flight data management device 230 can associate a subset of flight data with a local government role (e.g., in a manner designed to allow a local government administrator to access a portion, but not all, of the flight data for a UAV or UAV flight).

In some implementations, flight data management device 230 can further control access to flight data by controlling the scope of access to a portion of flight data. For example, rather than permitting access to all UAV location data for a UAV flight, flight data management device 230 can limit the scope of UAV location data available to a local government entity by permitting access to only UAV location data that falls within a predefined location (e.g., within the local government's jurisdiction) and/or limiting the granularity, or specificity, of UAV location data (e.g., specifying a UAV 220 location as a postal code rather than specific GPS coordinates). As another example, multiple UAV pilots might use the same UAV for different UAV flights, and flight data management device 230 can limit flight data available to each different UAV pilot (e.g., in a manner designed to permit a UAV pilot to access flight data for the flight(s) of the UAV only where the pilot was actively piloting the UAV). Other data access control methods can be used for flight data stored by flight data management device 230.

In this way, flight data management device 230 can store flight data to enable flight data management device 230 to provide access to extensive and accurate flight data based on a flight data request.

As further shown in FIG. 4, process 400 can include receiving, from a requesting device, a flight data request indicating the UAV (block 430). The flight data request can be received before, during, or after a UAV flight. In some implementations, requesting device 250 can provide, to flight data management device 230, a flight data request that specifies a UAV identifier or other information identifying the UAV 220. For example, a person might observe the UAV 220 (e.g., flying above the person's property) and, using an application of a requesting device 250 such as a cell phone, obtain a UAV identifier for the UAV 220 and send that UAV identifier to flight data management device 230 in a flight data request. An example application of the requesting device 250 might prompt a user to activate wireless communications that can receive a UAV identifier being broadcast by the UAV 220, or locate the UAV 220 or a serial number of the UAV 220 with a camera included in the requesting device 250, permitting the application to obtain the UAV identifier for the UAV 220 and generate the flight data request using the UAV identifier.

A flight data request can include a variety of information. In some implementations, a flight data request includes data identifying a requesting device 250 and/or an entity associated with the requesting device 250. For example, a flight data request can be submitted from a computing device operated by a crash investigator working for an entity that investigates UAV crashes. In this example situation, the flight data request can include data identifying the crash investigator, the computing device from which the request was sent, and/or the entity for which the crash investigator works.

In some implementations, a flight data request might not include a UAV identifier or UAV flight identifier, but data included in the flight data request can be used to identify a UAV or UAV flight. For example, a flight data request, that was provided by a requesting device 250 within sight of a UAV 220, can identify a geographic location of the requesting device 250 and a timestamp indicating when the flight data request was sent. In this example, flight data management device 230 can compare the geographic location and the timestamp to stored flight data for UAVs and/or UAV flights to identify a UAV flight near the geographic location of the requesting device 250 at the time the flight data request was sent.

In this way, flight data management device 230 can receive a flight data request that enables flight data management device 230 to determine response data based on the flight data request.

As further shown in FIG. 4, process 400 can include determining, based on the flight data request, response data, the response data including a subset of the flight data (block 440). For example, the flight data request could have been sent from a requesting device 250 associated with an entity, and flight data management device 230 can determine a subset of available flight data to include in the response data based on the entity (e.g., an identity of the entity, a role of the entity, a geographic location of the entity, or the like). Determining the subset of flight data to include in response data based on the source of the flight data request enables the flight data management device 230 to provide differentiated access to the flight data for different entities.

In some implementations, flight data management device 230 can determine a subset of data to be included in response data based on a role associated with an entity associated with a flight data request. For example, an owner/operator role can have access to all flight data, a pilot role can have access to all flight data except UAV flight history and UAV maintenance records, a public role can have access to only certain pieces of flight data, such as information identifying an owner of a UAV, or the like.

In some implementations, a role can be associated with any number of organizations and/or individuals. For example, a federal government role can apply to multiple federal government organizations, and a request from any of the applicable federal government organizations can be associated with the federal government role. In some implementations, an entity can be associated with multiple roles (e.g., the Federal Aviation Administration can have its own role and also have a federal government role). In an example situation where an entity associated with multiple roles requests flight data, flight data management device 230 can use one, some, or all applicable roles to determine which portions of flight data the entity can access (e.g., an entity with multiple roles might have access to any flight data accessible to any of the roles, or the entity might have access to only flight data accessible to a particular role, such as the most specific role).

In some implementations, flight data management device 230 can determine a subset of data to be included in response data based on an identity of an entity associated with a flight data request. For example, a user requesting flight data might have a specific user identifier, and access to flight data by the user can be limited to portions of flight data to which the specific user identifier has access. In some implementations, multiple identities, or identifiers, can be associated with a flight data request (e.g., a user requesting flight data might have both a user identifier that identifies the user and an organization identifier that identifies the organization for which the user works). As with entities associated with multiple roles, in an example situation where an entity has multiple identities, flight data management device 230 can use one, some, or all applicable identities to determine which portions of flight data the entity can access.

Flight data management device 230 can, in some implementations, determine a subset of data to be included in response data based on other data associated with a flight data request, such as a geographic location of a requesting entity, or geographic location associated with the request. For example, a flight data request can be received from a particular geographic location, or from an entity associated with the particular geographic location. In a situation where geographic restrictions (e.g., based on government regulations, company policies, or the like) limit flight data that can provided to entities in or associated with the particular geographic location, the flight data management device 230 can use such restrictions to determine a subset of flight data accessible to the requesting entity.

In some implementations, an entity can be associated with multiple identities, roles, geographic locations, and/or other data used to determine which portions of flight data the entity can access. In this situation, flight data management device 230 might use a variety of techniques to determine which portions of flight data the entity can access. For example, flight data management device 230 can determine that an entity is entitled to access any subset of flight data available to any role, identity, and/or geographic location associated with the entity. As another example, flight data management device 230 can choose a most specific role or identity associated with an entity to determine which subset of flight data is accessible to the entity.

The manner in which flight data management device 230 determines response data can vary (e.g., depending on the manner in which flight data is stored and what information is included in the flight data request). For example, flight data can be stored in a database using a table for a UAV, rows for UAV flights of the UAV, and a column for each piece of flight data. In this example, flight data management device 230 can store data indicating which tables, rows, and/or columns an entity or role can access. Based on an entity identifier or role associated with a flight data request, flight data management device 230 can determine access based on the entity and obtain the corresponding flight data from the database, identifying or storing the corresponding flight data as response data.

In some implementations, a flight data request can include data specifying particular flight data to which the requesting entity desires access. For example, an organization might send a request for all flight data associated with a particular UAV during a particular window of time. In this example, flight data management device 230 can determine a subset of flight data the organization has permission to access (e.g., using an access control list and an identifier of the organization) and obtain the subset of flight data (e.g., from a database) using permissions and the window of time to limit flight data determined to be response data.

In this way, flight data management device 230 can determine response data that enables flight data management device 230 to perform an action associated with the response data.

As further shown in FIG. 4, process 400 can include performing an action associated with the response data (block 450). For example, flight data management device 230 can perform an action associated with the response data. Example actions can include: providing a device (e.g., the requesting device 250 that provided the flight data request and/or another device) with a subset of flight data, causing display (e.g., at the requesting device 250 that provided the flight data request and/or another device) of the subset of flight data included in the response data, providing a notification to the requesting device 250 that provided the flight data request and/or another device (e.g., a notification regarding whether access to flight data is permitted and/or how to access the subset of flight data), providing instructions that cause a UAV to perform a UAV action (e.g., causing a UAV associated with response data to land and/or change course), or the like.

By way of example, flight data management device 230 can provide a requesting device 250 associated with a law enforcement officer with a subset of flight data that includes a report identifying a UAV pilot identifier, UAV pilot contact information, and/or UAV pilot location, or the like (e.g., enabling the law enforcement officer to contact the UAV pilot regarding any potential law enforcement issues). In this situation, for example, response data provided by flight data management device 230 can cause a report to display the subset of flight data using an application on a mobile device of the law enforcement officer.

As another example, flight data management device 230 can cause display of a subset of flight data that includes wind speed measurements, UAV speed data, UAV location data, UAV altitude data, and/or UAV maintenance records, or the like (e.g., providing a web interface or web page for a UAV crash investigator to access and view flight data that might be relevant to a UAV crash or malfunction). In this situation, for example, response data determined by flight data management device 230 can cause a web server to provide a web resource that displays the subset of flight data.

As yet another example, flight data management device 230 can provide a local government administrator's device with a subset of flight data that includes a UAV pilot identifier, UAV pilot contact information, and/or UAV organization contact information, or the like (e.g., enabling a local government to contact an organization responsible for the UAV to communicate local UAV regulations and/or applicable licensing information). In this situation, for example, flight data management device 230 can provide response data to a server device associated with the local government, enabling the server device to handle response data in a manner determined by an administrator of the server device. The response data can, for example, enable the local government to implement various UAV-related services such as UAV tracking, licensing, and/or tolling services (e.g., flight data provided to the local government can enable the local government to contact the UAV owner/operator regarding obtaining a license to fly in local government airspace and/or to pay a toll for using local government airspace)

As another example action, flight data management device 230 can, based on the response data, notify a third party. For example, in a situation where flight data management device 230 provides a law enforcement officer with response data associated with a UAV or UAV flight, flight data management device 230 can also send a notification and/or a copy of the response data to an owner/operator of the UAV. As another example, in a situation where flight data management device 230 provides a threshold number of civilians with response data associated with a UAV or UAV flight, flight data management device 230 can also send a notification to a law enforcement agency and/or an owner/operator of the UAV.

In some implementations, flight data management device 230 can provide, based on response data, data that enables feedback to be provided to flight data management device 230. For example, flight data management device 230 can provide requesting device 250 with data that enables a user of the requesting device 250 to provide feedback and/or instructions. By way of example, flight data management device 230 can provide a law enforcement officer's mobile device with data that causes a user interface to display options, such as a feedback form for the law enforcement officer to provide feedback to an administrator of flight data management device 230, or selectable instructions that cause flight data management device 230 to send feedback to an owner/operator of a UAV, or command and control instructions that cause the UAV to take a particular action, or the like.

In some implementations, flight data management device 230 can perform an action based on the receipt of a threshold number of flight data requests. For example, based on receiving a threshold number of flight data requests associated with a particular UAV, UAV flight, and/or UAV pilot, flight data management device 230 can provide a local law enforcement entity with response data that includes flight data for the particular UAV, UAV flight, and/or UAV pilot.

In this way, flight data management device 230 can perform an action associated with the response data. The actions taken (e.g., providing controlled access to flight data) can enable processes to improve UAV flight safety and efficiency while improving the experience of members of the public and other entities desiring access to relevant UAV flight data.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel. In some implementations, one or more of the blocks of process 400 can be performed before a UAV is in flight, while a UAV is in flight, and/or after a UAV flight is concluded.

Figure 5:
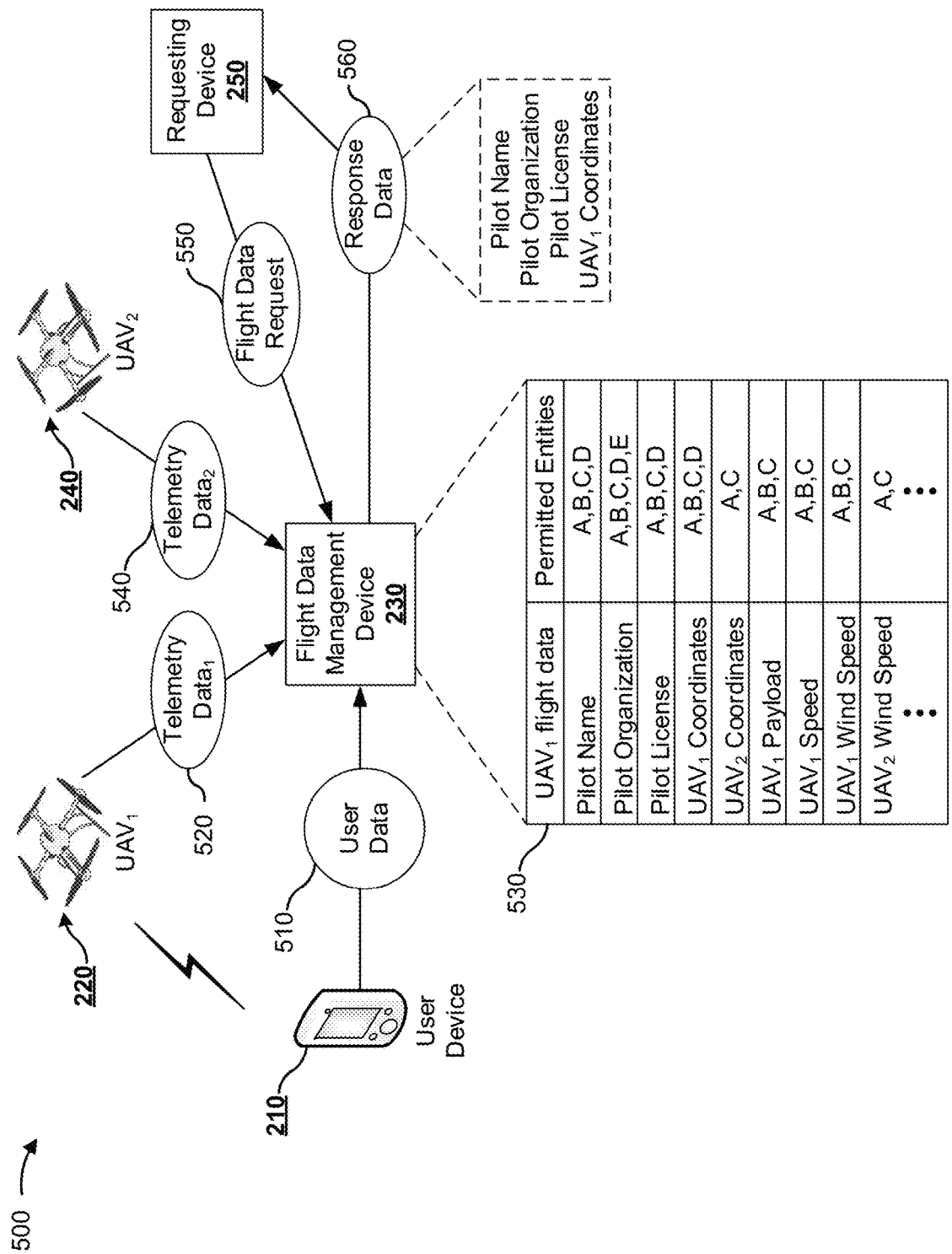
FIG. 5 is a diagram of an example implementation relating to the example process shown in FIG. 4.

FIG. 5 is a diagram of an example implementation 500 relating to example process 400 shown in FIG. 4. FIG. 5 shows an example of managing UAV flight data and depicts an example user device 210, example UAV 220, an example flight data management device 230, an example flight data provider 240, and an example requesting device 250.

As shown in FIG. 5, flight data management device 230 receives user data 510 from a user device 210 that is in communication with a UAV 220 (e.g., identified in FIG. 5 as $UAV_1$). User data 510 can include flight data relevant to a UAV flight associated with the UAV 220, such as a UAV pilot name, pilot organization, pilot license data, or the like. As also shown in FIG. 5, flight data management device 230 receives telemetry data 520 (e.g., identified in FIG. 5 as Telemetry $Data_1$) from the UAV 220. Telemetry data 520 can include flight data relevant to the UAV flight associated with the UAV 220, such as UAV coordinates, UAV payload data, UAV speed measurements, UAV wind speed measurements, or the like.

In the example implementation 500, flight data management device 230 stores flight data 530 for a flight associated with the UAV 220. The flight data 530 includes data regarding pilot name, pilot organization, pilot license, $UAV_1$ coordinates, $UAV_1$ payload, $UAV_1$ speed, and $UAV_1$ wind speed. The flight data 530 also includes some telemetry data 540 provided by a flight data provider 240. In the example implementation 500, the flight data provider 240 is a UAV (e.g., $UAV_2$ might be near $UAV_1$ and capable of providing telemetry $data_2$ that can be used in addition to or as an alternative to other flight data). In this example, the flight data management device 230 includes, in the flight data 530 for the UAV flight, $UAV_2$ coordinates and $UAV_2$ wind speed.

As further shown in FIG. 5, the flight data management device 230 defines various levels of access to the flight data 530. In this example, the flight data management device 230 identifies entities, or roles, that are permitted to access the various pieces of flight data. By way of example, entity A can be a UAV pilot entity with access to all of the example flight data 530. Entity B can be a pilot employer entity with access to all of the example flight data 530 except for data provided by UAVs 220 not owned or operated by the pilot employer entity (e.g., in this example, $UAV_2$ coordinates and $UAV_2$ wind speed, provided by $UAV_2$, might not be accessible to the pilot employer entity, or entity B). Entity C can be a government flight safety organization with access to all of the example flight data 530 (e.g., to facilitate investigation of UAV malfunctions, improper uses of UAVs, and/or UAV crashes). Entity D can be a municipal UAV licensing authority with access to pilot name, pilot organization, pilot license, and $UAV_1$ coordinates (e.g., to enable the municipal UAV licensing authority to ensure UAV flights within certain airspace have proper licenses). Lastly, entity E can be a public entity with access to pilot organization data (e.g., enabling members of the public the ability to identify an organization and/or contact information for an organization associated with a UAV).

As further shown in FIG. 5, flight data management device 230 receives a flight data request 550 from a requesting device 250. The flight data management device 230 can use the flight data request 550 to determine a subset of the flight data 530 that is available to the requesting device 250. For example, the flight data request 550 can include or be otherwise associated with an identifier that identifies an entity associated with the flight data request 550, such as entity D (i.e., a municipal UAV licensing authority). The flight data management device 230 can use data identifying entity D in the flight data request 550 to determine that the pilot name, pilot organization, pilot license, and $UAV_1$ coordinates data are accessible to entity D.

As further shown in FIG. 5, the flight data management device 230 provides response data 560 to the requesting device. The response data 560 includes the subset of the flight data 530 that was identified as accessible by the requesting device 250 (e.g., the pilot name, pilot organization, pilot license, and $UAV_1$ coordinates). In this example, the requesting device 250 and/or its associated entity, the municipal UAV licensing authority, can view the subset of flight data included in the response data 560 (e.g., enabling the municipal UAV licensing authority to determine whether $UAV_1$ is in its airspace and whether a license for that airspace is required or has already been obtained by the pilot or organization associated with $UAV_1$).

As indicated above, FIG. 5 is provided merely as an example. Other examples are possible and can differ from what was described with regard to FIG. 5. Some implementations of flight data management device 230 described herein can improve the collection, management, and providing of flight data for UAVs. Improved flight data collection (e.g., using LTE Cat M1 or similar technology to obtain beyond visual line of sight data, and/or using flight data providers to obtain relevant flight data), alone or in combination with controlled access to flight data, can facilitate a variety of services related to UAV flights. Such UAV services can improve UAV flight safety (e.g., by making relevant flight data available to those investigating or studying UAV malfunctions and crashes), improve UAV pilot experience (e.g., by providing UAV pilots with access to flight data from other UAVs), improve management of UAV fleets (e.g., by providing organizations with access to all data regarding all flights of the organization's UAV, and/or allowing organizations to control access to their own flight data), and improve public experience (e.g., by providing the public with controlled access to relevant flight data).

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as might be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive flight data associated with an unmanned aerial vehicle (UAV),
at least some of the flight data being received from the UAV and at least some of the flight data being received from a flight data provider that is separate from the UAV and the device;
receive, from a requesting entity, a flight data request, the flight data request including:
information identifying the UAV or a flight of the UAV, and
data identifying the requesting entity;
identify a role associated with the requesting entity, the role defining which portions of flight data are accessible to entities associated with the role;
determine response data based on the role, the response data including a subset of the flight data, the subset of the flight data being available to be accessed by the requesting entity; and
perform an action associated with the response data.

2. The device of claim 1, wherein the flight data includes data identifying at least one of:
flight date,
flight time,
flight duration,
flight altitude,
flight origin location,
flight destination location,
flight path,
wind speed,
humidity,
temperature,
precipitation,
visibility,
sunset time,
UAV model number,
UAV owner/operator,
UAV pilot,
UAV flight ceiling,
UAV weight,
UAV maximum payload,
UAV maximum wind speed,
UAV maximum operating temperature,
UAV minimum operating temperature,
UAV maximum communication range,
UAV maximum flight duration,
UAV maximum speed,
UAV maintenance data,
UAV noise level,
pilot location,
pilot certifications,
pilot maximum operating wind speed,
pilot maximum flight operating duration,
pilot minimum operating visibility,
pilot maximum operating range,
most recent pilot flight,
career pilot hours,
pilot contact information, or
pilot employer contact information.

3. The device of claim 1, wherein the one or more processors, when receiving the flight data, are to:
receive the at least some flight data received from the UAV via a Long-Term Evolution Category M1 transmission of flight data from the UAV.

4. The device of claim 1, wherein the one or more processors, when receiving the flight data, are to:
receive another portion of the flight data from a user device in communication with the UAV.

5. The device of claim 1, wherein the one or more processors, when receiving the flight data, are to:
receive another portion of the flight data from an aircraft.

6. The device of claim 1, wherein the flight data received from the UAV was received via a separate UAV that is separate from the device and the UAV.

7. The device of claim 1, wherein the one or more processors, when receiving the flight data, are to:
receive another portion of the flight data from a separate UAV that is separate from the device and the UAV.

8. The device of claim 7, wherein the other portion of the flight data from the separate UAV includes flight data from a sensor of the separate UAV.

9. A non-transitory computer-readable medium storing instructions, the instructions comprising:
one or more instructions that, when executed by one or more processors of a device, cause the one or more processors to:
receive flight data associated with an unmanned aerial vehicle (UAV),
at least some of the flight data being received from the UAV and at least some of the flight data being received from a flight data provider that is separate from the UAV and the device;
receive, from a requesting entity, a flight data request, the flight data request including information identifying:
the UAV or a flight of the UAV, and
data identifying the requesting entity;
identify a role associated with the requesting entity, the role defining which portions of flight data are accessible to entities associated with the role;
determine response data based on the role, the response data including a subset of the flight data, the subset of flight data being available to be accessed by the requesting entity; and
perform an action associated with the response data.

10. The non-transitory computer-readable medium of claim 9, wherein the one or more instructions, that cause the one or more processors to determine the response data, cause the one or more processors to:
  determine the subset of the flight data based on a limitation included in the flight data request,
    the limitation specifying a limit on the flight data.

11. The non-transitory computer-readable medium of claim 9, wherein the role is one of a plurality of roles,
  each of the plurality of roles being associated with a respective right to access respective portions of the flight data.

12. The non-transitory computer-readable medium of claim 9, wherein:
  the flight data request is received during the flight of the UAV; and
  the one or more instructions, that cause the one or more processors to perform the action, cause the one or more processors to:
    perform the action during the flight of the UAV.

13. A method, comprising:
  receiving, by a device, flight data associated with an unmanned aerial vehicle (UAV),
    at least some of the flight data being received from the UAV and at least some of the flight data being received from a flight data provider that is separate from the UAV and the device;
  receiving, by the device and from a requesting entity, a flight data request,
    the flight data request including information identifying:
      the UAV or a flight of the UAV, and
      data identifying the requesting entity;
  identifying, by the device, a role associated with the requesting entity,
    the role defining which portions of flight data are accessible to entities associated with the role;
  determining, by the device, response data based on the role,
    the response data including a subset of the flight data, the subset of the flight data being available to be accessed by the requesting entity; and
  performing, by the device, an action associated with the response data.

14. The method of claim 13, wherein receiving the flight data associated with the UAV includes:
  receiving a periodic transmission of the flight data from the UAV.

15. The method of claim 14, wherein the periodic transmission of the flight data is received using a Long-Term Evolution Category M1 receiver of the device.

16. The method of claim 13, wherein performing the action associated with the response data includes:
  providing the response data to a requesting device, associated with the requesting entity, to cause display of the subset of the flight data at the requesting device.

17. The method of claim 16, wherein the requesting device is a user device in communication with the UAV.

18. The method of claim 13, wherein performing the action associated with the response data includes:
  providing the response data to a web server to cause the web server to provide a web resource that causes display of the subset of the flight data.

19. The method of claim 13, wherein performing the action associated with the response data includes:
  providing a notification to a third party device,
    the third party device being associated with a third party entity that is separate from the requesting entity.

20. The method of claim 13, wherein performing the action associated with the response data includes:
  causing the UAV to perform a UAV action.

* * * * *